United States Patent [19]

McMahon et al.

[11] 4,094,579
[45] June 13, 1978

[54] MULTIMODE OPTICAL WAVEGUIDE DEVICE WITH NON-NORMAL BUTT COUPLING OF FIBER TO ELECTRO-OPTIC PLANAR WAVEGUIDE

[75] Inventors: Donald H. McMahon, Carlisle; Arthur R. Nelson, Stow, both of Mass.

[73] Assignee: Sperry Rand Corporation, New York, N.Y.

[21] Appl. No.: 722,898

[22] Filed: Sep. 13, 1976

[51] Int. Cl.$^2$ .............................................. G02B 5/14
[52] U.S. Cl. ............................ 350/96.17; 350/96.14; 350/355
[58] Field of Search ........... 350/96 WG, 96 C, 160 R

[56] References Cited

U.S. PATENT DOCUMENTS

| | | | |
|---|---|---|---|
| 3,674,337 | 7/1972 | Marcatili | 350/96 WG |
| 3,795,433 | 3/1974 | Channin | 350/96 C X |
| 3,864,019 | 2/1975 | Smolinsky et al. | 350/96 WG |
| 3,912,363 | 10/1975 | Hammer | 350/96 WG X |
| 3,967,877 | 7/1976 | Heidrich et al. | 350/96 C |
| 4,018,506 | 4/1977 | Hammer | 350/96 C |

OTHER PUBLICATIONS

Tien et al., "Light Beam Scanning and Deflection . . . ", *Applied Physics Letters*, vol. 25, No. 10, 15 Nov. 1974, pp. 563-565.
Goben et al., "Mode Selective Filtering by . . .", *Applied Optics*, vol. 13, No. 12, Dec. 1974, pp. 2757-2758.
Nelson et al., "Electro-Optic Channel Waveguide Modulator . . .", *Applied Physics Letters*, vol. 28, No. 6, 15 Mar. 1976, pp. 321-323.
Soref et al., "Multimode Achromatic Electro-Optic Waveguide . . .", *Applied Physics Letters*, vol. 28, No. 12, 15 Jun. 1976, pp. 716-718.

*Primary Examiner*—John K. Corbin
*Assistant Examiner*—John D. Lee
*Attorney, Agent, or Firm*—Howard P. Terry; Seymour Levine

[57] ABSTRACT

A structure for electro-optic channeling of multimode light radiated from multimode fiber optic waveguides is disclosed. The light is channeled in a planar optic waveguide comprised of a high index electro-optic material to which the fiber optic waveguide is non-normal butt coupled to achieve higher in-plane collimation and greater confinement of divergent light beams with lower control voltages.

9 Claims, 5 Drawing Figures

MULTIMODE OPTICAL WAVEGUIDE DEVICE WITH NON-NORMAL BUTT COUPLING OF FIBER TO ELECTRO-OPTIC PLANAR WAVEGUIDE

BACKGROUND OF THE INVENTION

1. Field of the Invention

This invention relates to optical couplers and, more particularly, to optical couplers for coupling multimode light contained in optical fibers to planar optical waveguides.

2. Description of the Prior Art

Optical communications systems provide large bandwidths and the number of message channels that may be realized and the rapidity with which information may be transmitted far exceeds that obtainable with more conventional electromagnetic transmission systems. To realize such a communications system low loss fiber optic waveguides and optical processing devices have been developed. Fiber optic waveguides transmit the light contained therein in a multiplicity of optical modes while the processing devices generally can handle but a single mode. Consequently, the light energy contained in but a small percentage of the propagating modes of a fiber optic waveguide is coupled to the processing device and an extremely high energy loss is realized.

Optical switches and modulators have been proposed that can propagate multimode energy. One such device takes the form of a voltage induced planar optical waveguide as disclosed by Channin in U.S. Pat. No. 3,795,433. The relatively small change in refractive index produced electro-optically in this device is insufficient to handle the multimode light energy exiting any single multimode fiber without an effective means for multimode coupling. Though efficient techniques have been proposed for optically coupling light wave energy between planar optical waveguides and optical fiber waveguides, such as the techniques disclosed by Hammer in U.S. Pat. No. 3,912,363 and by Smolinsky et al in U.S. Pat. No. 3,864,019, these have provided coupling primarily for a single mode or for a relatively small percentage of the modes of the multimode fiber. No single prior art device has been disclosed that both efficiently couples to an optical waveguide all of the light emitted by a single multimode fiber and also permits efficient switching of an appreciable fraction of this multimode energy with voltages well below the electro-optic breakdown voltage.

SUMMARY OF THE INVENTION

The present invention relates to a means for efficiently coupling multimode energy from fiber optical waveguides to planar optical waveguides. As will be more fully described in the description of the invention to follow, this coupling is accomplished by utilizing non-normal butt coupling between the fiber optical waveguide and the electro-optical waveguide, thereby accomplishing a magnification between the diameter of the light bundle and divergence in the optical fiber and the width of the light bundle and divergence in the electro-optical waveguide. These magnifications establish propagation paths within a sufficiently confined region of the electro-optic waveguide so that the light energy may be channelized, or switched between channels, by the application of reasonable voltage levels. This technique may be employed to independently control the width and the angular divergence magnifications in two orthogonal directions and in this manner optical fibers may be efficiently coupled to electro-optic waveguides though the diameter of the fiber exceeds the thickness of the waveguide. By employing birefringent devices and properly arranging the electrode structure, the need for employing polarizers, which may cause relatively large absorption, reflection and misalignment losses, is eliminated.

BRIEF DESCRIPTION OF THE DRAWINGS

FIG. 5 is a top view of the apparatus of which FIG. 4 is a side view.

DESCRIPTION OF THE PREFERRED EMBODIMENT

Figure 1:
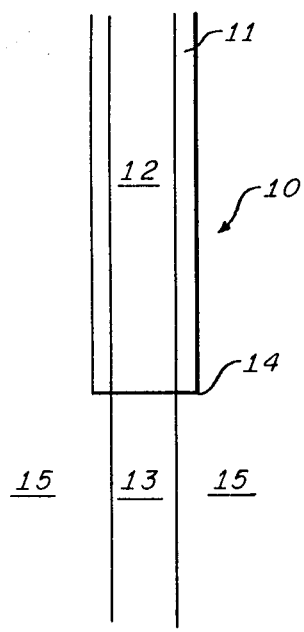
FIG. 1 is an edge-on view of an optical fiber butt coupled to an electro-optic substrate.

Entrapment in an electro-optic medium of the light contained in an optical fiber can be readily achieved in one dimension by limiting the thickness of the electro-optic medium to the fiber core diameter. This is illustrated in FIG. 1 wherein an optical fiber 10 with cladding 11 and core 12 is shown butt coupled to electro-optic medium 13 at the interface 14. Entrapment of the light in the plane of electro-optic medium 13 is assured by choosing the index of refraction of electro-optic medium to be higher than the index of refraction of the medium 15 on either side thereof. However, in addition to entrapping the light waves emanating from the fiber the electro-optic medium must also induce channels to control the angular distribution of the light energy in the plane of the electro-optic substrate. It can be readily shown that a medium with a refractive index $n$ which is subjected to an electro-optically induced index increase of $\Delta n$ over the width of a desired propagation channel will provide a channel with a critical angle for internal reflection that is given by:

$$\theta_c^2 = 2\Delta n/n$$

Snell's Law for near normal incidence is given by:

$$\theta'/\theta = n/n'$$

where the primed and unprimed values refer to the first and second media respectively. Therefore, at near normal incidence the ratio of the angular divergence of a light beam in the two media is the inverse of the ratio of the index of refraction of the media under consideration. Consequently, a light beam with an angular divergence of 8.05° in air translates into an angular divergence of 5.48° in fused silica [N = 1.47] and into 3.66° in LiNbO$_3$ [N = 2.2].

To form an opical channel in LiNbO$_3$ to confine a beam with a half-angle divergence of 3.66° a change in the refractive index $\Delta n$ of 4.5 × 10$^{-3}$ is required. LiNbO$_3$ has an electro-optic coeffient that produces a change in refractive index of 5 × 10$^{-4}$ across 3 mils when 200 volts is applied. Therefore, to produce the change of 4.5 × 10⁻³ across the same 3 mils requires approximately 1800 volts. Unfortunately, the breakdown voltage of LiNbO₃ with a thickness of 3 mils is approximately 1000 volts. Consequently, either the throughput efficiency of the channel must be reduced by using voltages less than the breakdown voltage which do not confine the entire beam in the channel, or the divergence of the light beam entering from the fiber must be reduced. This reduction in divergence could be effected with a lens to form a magnified image of the end of the fiber on the end surface of the electro-optic substrate. In this case the angular range is inversely proportional to the magnification. However, lenses do not lend themselves easily to creating a compact structure and spherical lenses also double the thickness of electro-optic layer thereby doubling the voltage for a specified induced index change. What is required is a compact structure which changes the beam divergence in the plane of the electro-optic substrate without changing the divergence perpendicular to the plane which is readily controlled by the substrate index itself.

Figure 2:
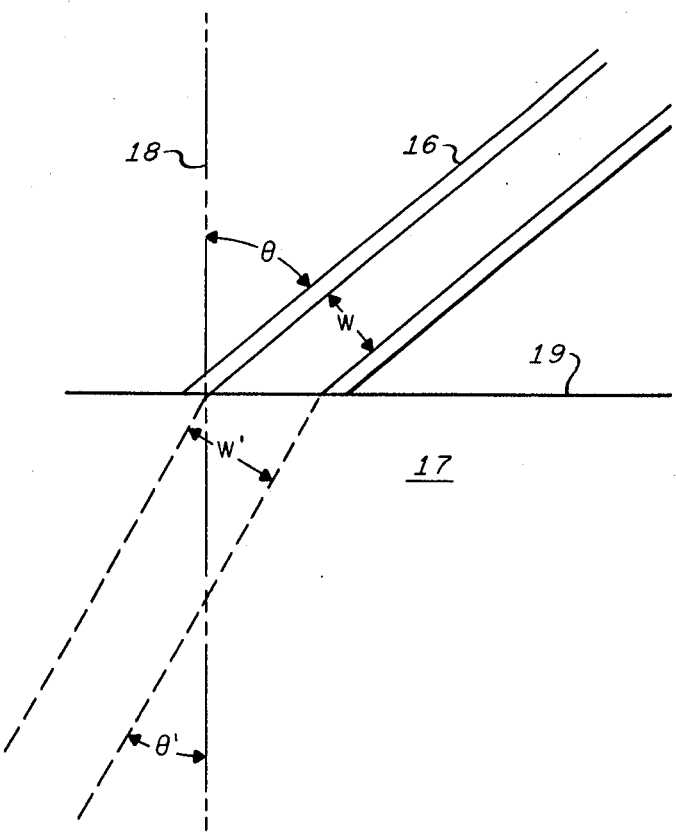
FIG. 2 is a top view of an optical fiber butt coupled to an electro-optic substrate in accordance with one aspect of the invention.

Refer now to FIG. 2 wherein is shown an optical fiber 16 butt coupled to substrate 17 at an angle θ from the perpendicular 18 to the substrate surface 19. It can readily be shown that this type of butt coupling accomplishes a width magnification (W'/W) given by:

$$M_W = W'/W = \cos \theta' / \cos \theta$$

It can also be shown that a divergence magnification $M_D$ given by:

$$M_D = (n/n') (1/M_W)$$

is also accomplished. It should be observed that the angular magnification factor is inversely proportional to the width magnification $M_W$. Consequently, to provide the divergence in the LiNbO₃ that is ½ the angular divergence therein for perpendicular butt coupling, it is required that $M_W$ be equal to 2. Once the divergence magnification factor $M_D$ and width magnification faction $M_W$ are determined, the angles θ and θ' may be computed from the definition of the width magnification and Snell's Law. Assume, as previously, the butt coupling of fused silica fiber 3 mils in diameter to a LiNbO₃ substrate 3 mils thick but with a width magnification of 2 which results in a half-angle divergence in the LiNbO₃ of 1.83°. This is accomplished with θ and θ', computed from definition of width magnification and Snell's Law, equal to 66.5° and 37°, respectively. With this two fold reduction in divergence angle the required index change is reduced four-fold to 1.1 × 10⁻³, which may be accomplished with only 450 volts applied across a LiNbO₃ substrate of 3 mils in thickness, which is well below the breakdown level.

Figure 3:
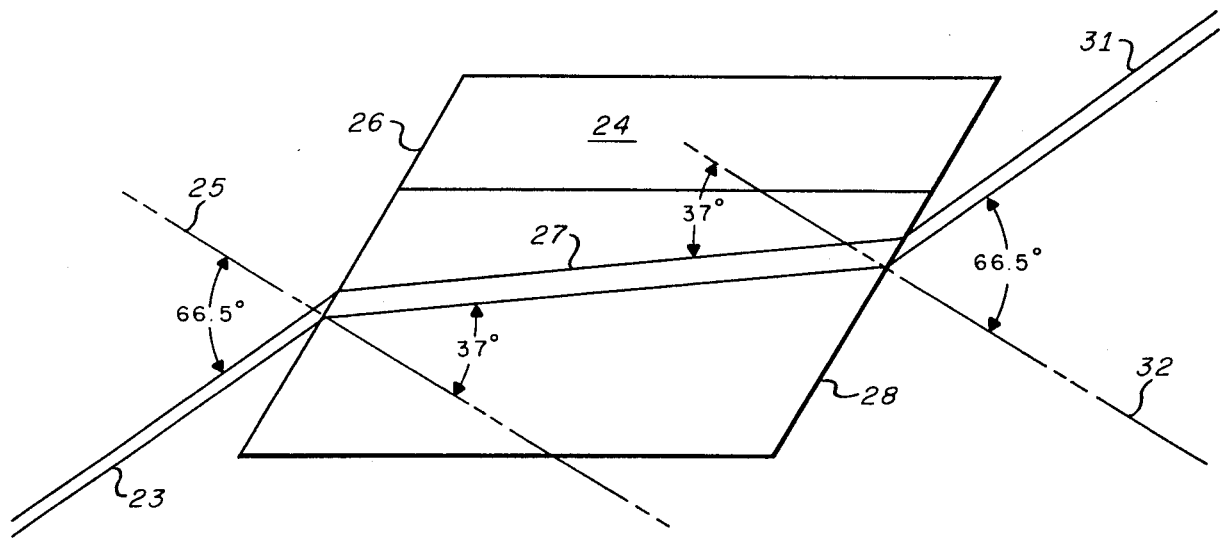
FIG. 3 illustrates the butt coupling of optical fibers to an electro-optic substrate wherein the angular relationship of the optical fibers to the substrate and the propagation path within the substrate are represented.

FIG. 3 represents the manner in which input and output optical fibers with fused silica cores may be coupled to a LiNbO₃ substrate to effect a 4:1 decrease in the required change in the index of refraction in the substrate to channelize the light energy emitted from the input optical fiber. In FIG. 3, the input optical fiber 23 is butt coupled to a LiNbO₃ substrate 24 making an angle of 66.5° with the perpendicular 25 to the edge 26 of substrate 24. 450 volts are appropriately applied to the substrate 24 to establish a propagation channel 27 at an angle of 37° from the perpendicular 25 to the edge 26. At the exit edge 28 of the substrate 24 an output fiber 31 is butt coupled to the exit edge 28 forming an angle of 66.5° with the perpendicular 32 to the exit edge 28 and aligned with channel 27 which forms an angle of 37° with the perpendicular 32 to the edge 28.

Figure 5:
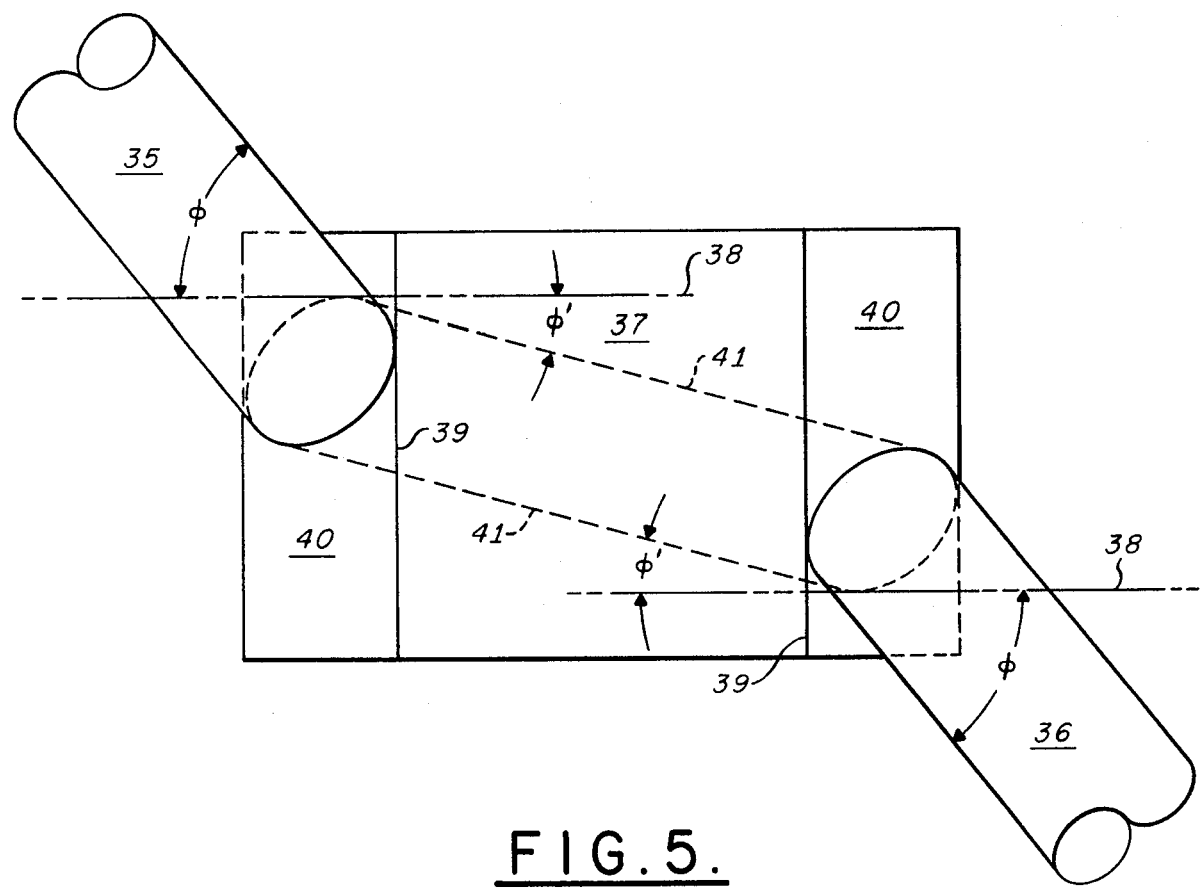
Figure 4:
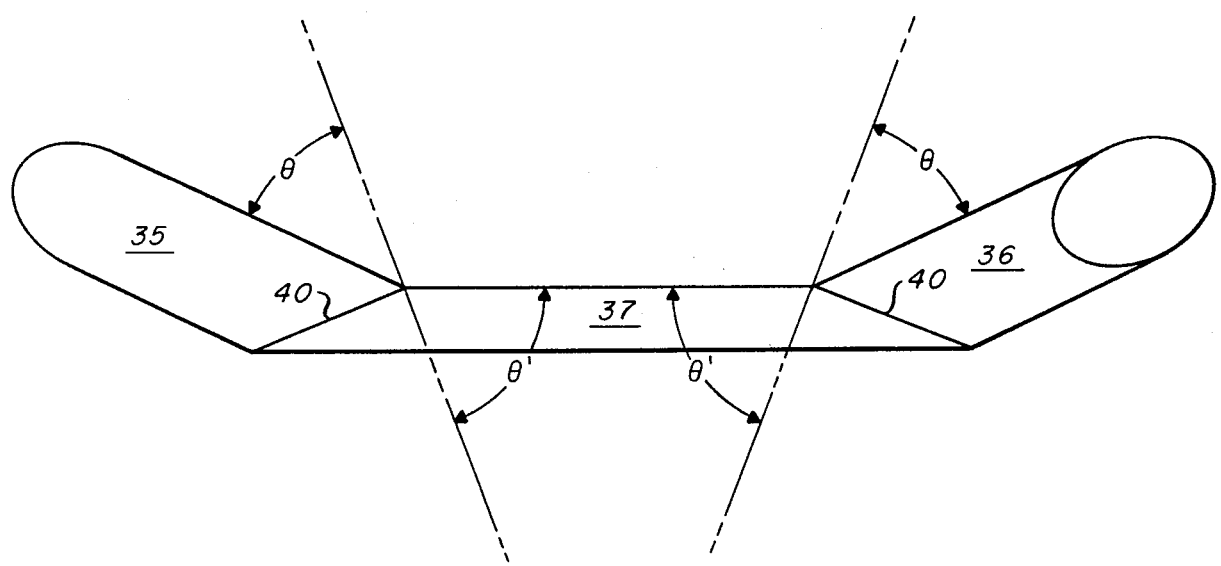
FIG. 4 is a side view of an apparatus wherein optical fibers are butt coupled to an electro-optic substrate in accordance with the invention.

A method for coupling an optical fiber to a substrate to provide a divergence magnification when the diameter of the fiber and the thickness of the substrate are essentially equal has hereinbefore been described. When the diameter of the optical fiber is increased, the procedures utilized heretofore necessitate an increase in the thickness of the substrate and concomitantly an increase in the operating voltage in direct correspondence with the increase in diameter. This increase in the thickness of the substrate, with an increase in the fiber diameter, may be avoided by applying Snell's Law in two dimensions, which provides for independently controlling the channel magnification and angular divergence in two orthogonal directions. This double use of Snell's Law is illustrated in FIGS. 4 and 5. Referring to FIG. 4, a side view of the butt coupling of an input optical fiber 35 and an output optical fiber 36 to a substrate 37, wherein both of the optical fibers have diameters in excess of the thickness of the substrate, is shown. The width reduction may be accomplished by: determining the width reduction required; utilizing Snell's Law to determine θ and θ' consistent with the index of refraction of the substrate 37 and the optical fibers 35 and 36 and the width reduction; then providing input and output edge surfaces, the perpendiculars to which each form an angle θ' with the plane of substrate 37 and an angle θ with the optical fibers 35 and 36, respectively.

Refer now to FIG. 5 wherein is shown a top view of the butt coupling of input fiber 35 and output fiber 36 to substrate 37. An angular demagnification in the plane of the substrate is accomplished by determining the angles φ and φ', as heretofore described. As shown in the figure, the angle φ is the angle between the perpendicular 38 to the line 39 formed by the intersection of the plane of the substrate 37 with the plane of the butting surface 40 and φ' is the angle between the perpendicular 38 and the light propagation path 41 within the substrate 37.

When utilizing the heretofore described coupling between an optical fiber and an optical waveguide, it is at times necessary to insert a polarizer between the crystal and input fiber, since the net electro-optical effect depends both upon the direction of the applied electrical field and the polarization of the light wave relative to the crystal axis. The device most likely to be utilized as an electro-optic waveguide employs the Z-cut crystal where the electric field is applied across the thin dimension (Z direction) of the crystal. The value of the $r_{33}$ coefficient then governs the refractive index change seen by the TM wave while the TE waves are effected only by the smaller $r_{13}$ coefficient (for LiNbO₃ or LiTaO₃, $r_{13} \approx \frac{1}{4} r_{33}$). Therefore, in order to have large modulation depth, or a low crosstalk in the switch, it is often necessary to limit the input light to only the TM polarization.

Use of the polarizer may cause relatively large absorption, reflection and misalignment losses, when high angle butt coupling is employed. However, the necessity for a polarizer may be avoided by choosing a crystal with a large birefrigence and properly arranging the electrode structure. For example, the indices of refraction seen by the TE and TM waves in LiNbO₃ are 2.25 and 2.17 respectively (λ = 0.85μm). When the fiber is butt coupled to the LiNbO₃ at an angle of 66° for 2:1 collimation, the angular separation for the two polarizations in the LiNbO$_3$ is nearly 2°, which is enough to separate most of the light cones if the input numerical aperture is less than 0.15. Higher collimations will give more complete separations. Thus the electrode structure may be positioned to capture the TM polarization and ignore the less easily controlled TE polarization.

In some cases, such as an element of a data bus, it is desirable to limit the throughput loss of each device to the lowest possible value even if it is necessary to sacrifice some modulation depth or cross talk isolation. In this case, a crystal such as LiTaO$_3$ can be used to capture both polarizations since its birefringence is very small and both the TE and TM polarizations will travel in the same direction after non-normal incidence butt coupling. The higher angle TE waves which are not captured by the guides due to the lower $r_{13}$ coefficient can often be allowed to escape harmlessly into the crystal if the guides are appropriately arranged so that the escaping energy does not strike the output ports.

While the invention has been described in its preferred embodiment, it is to be understood that the words which have been used are words of description rather than limitation, and that changes may be made within the purview of the appended claims without departing from the true scope and spirit of the invention in its broader aspects.

We claim:

1. An optical waveguide device comprising:
   a planar optic waveguide having an index of refraction $n_1$ and an end region whereat light energy is coupled for guidance therein;
   a fiber optic waveguide with core diameter $W_2$ and an index of refraction $n_2$ butt coupled to said end region of said planar optic waveguide in a manner so that its axis forms an angle $\theta_2$, other than zero, with a perpendicular to said end region such that light energy propagating in said fiber optic waveguide is coupled to said planar optic waveguide within a region $W_1$ thereby accomplishing a magnification $M_W$ for the width of the light energy that is given by $M_W = W_1/W_2 = \cos\theta_1/\cos\theta_2$ and a divergence magnification $M_D$ that is given by $M_D = (n_2/n_1)(1/M_W)$ where $\theta_1$ is the angle made by the propagation path, in said planar optic waveguide with said perpendicular to said end region and is determined from $n_1 \sin\theta_1 = n_2 \sin\theta_2$ 2. An optical waveguide device in accordance with claim 1 wherein said planar optic waveguide is comprised of an electro-optic medium which provides a well-defined optical channel upon the application of a predetermined voltage whereby light energy coupled from said optical fiber waveguide is guided therethrough.

3. An optical waveguide device in accordance with claim 2 wherein said planar optic waveguide includes a second end region whereat optical energy guided along said optical channel is coupled therefrom and further including a second fiber optic waveguide, butt coupled to said second end region, to receive light energy from said optical channel in said planar optic waveguide, said second fiber optic waveguide being coupled to said second end region at a second angle $\theta_1$ to a perpendicular thereto which is equal to said angle $\theta_1$ formed by said fiber optic waveguide with said perpendicular to said end region.

4. An optical waveguide device in accordance with claim 3 wherein said planar optic waveguide possesses birefringent properties whereby TE and TM modes propagate therein in different directions thereby negating the requirement for a polarizer and whereby said TE and TM modes may be separately controlled thereby providing increased modulation depth and decreased crosstalk.

5. An optical waveguide device in accordance with claim 3 wherein said planar optic waveguide essentially is non-birefringent whereby TE and TM modes therein propagate essentially in the same direction thereby maximizing optical power throughput.

6. An optical waveguide device in accordance with claim 1 wherein said end region of said planar optic waveguide is a ramp between the upper and lower surfaces thereof, said surfaces forming an angle $\theta'$ with a perpendicular to said ramp in a plane normal to the plane of said planar optic waveguide, and wherein said diameter $W_2$ of said fiber optic waveguide is greater than the width $W_1$ of said planar optic waveguide, the axis of said fiber optic waveguide forming an angle $\theta$ with said perpendicular to said end region ramp in said plane normal to said plane of said planar optic waveguide, such that the length of said ramp times $\cos\theta$ is equal to the diameter of said fiber optic waveguide and wherein the angles $\theta$ and $\theta'$ are related by $W_2/W_1 = \cos\theta/\cos\theta'$ 7. An optical waveguide device in accordance with claim 6 further including a second fiber optic waveguide butt coupled to a second end region of said planar optic waveguide which forms a ramp between said lower and upper surfaces of said planar optic waveguide, the perpendicular to said ramp forming a second angle $\theta$ with the axis of said fiber optic waveguide and a second angle $\theta'$ with the surfaces of said planar optic waveguide in said plane normal to said plane of said planar optic waveguide and wherein said second angle $\theta$ and said second angle $\theta'$ are respectively equal to the angles $\theta$ and $\theta'$.

8. An optical waveguide device in accordance with claim 6 wherein said axis of said fiber optic waveguide forms an angle $\phi$, in the plane of said planar optic waveguide, with the perpendicular to the line defined by the intersection of said plane of said planar optic waveguide and the plane of said ramp comprising said edge section thereof and wherein light energy propagating in said planar optic waveguide propagates in a channel which forms an angle $\phi'$ with said perpendicular where the angles $\phi$ and $\phi'$ are determined from the formula:

$n_2 \sin\phi = n_1 \sin\phi'$

9. An optical waveguide device in accordance with claim 8 wherein said planar optical waveguide is comprised of an electro-optic medium which provides a well defined optical channel upon the application of a predetermined voltage pattern across the electro-optic medium and possesses a second end region in the form of a ramp between said upper and lower surfaces and further including a second fiber optic waveguide butt coupled to said planar optic waveguide at said second end region, to receive light energy from said channel, and wherein the axis of said fiber optic waveguide, forms a second angle $\phi$, in said plane of said planar optic waveguide, with the line defined by the intersection of the plane of said ramp of said second end region and said plane of said planar optic waveguide, said second angle $\phi$ being equal to said angle $\phi$.

* * * * *